US008962740B2

(12) United States Patent
Liang et al.

(10) Patent No.: US 8,962,740 B2
(45) Date of Patent: Feb. 24, 2015

(54) OXYGEN SCAVENGER SYSTEM IN A POLYOLEFIN MATRIX

(75) Inventors: Ying (Lora) Liang, Vernon Hills, IL (US); Surendra Agarwal, Glenview, IL (US); Alexander Greenfield, West Windsor, NJ (US)

(73) Assignee: Kraft Foods Group Brands LLC, Northfield, IL (US)

(*) Notice: Subject to any disclaimer, the term of this patent is extended or adjusted under 35 U.S.C. 154(b) by 205 days.

(21) Appl. No.: 13/608,603

(22) Filed: Sep. 10, 2012

(65) Prior Publication Data

US 2014/0073741 A1 Mar. 13, 2014

(51) Int. Cl.
C08L 51/06 (2006.01)

(52) U.S. Cl.
USPC ............................ 524/504; 525/73; 525/74

(58) Field of Classification Search
USPC ..................................... 524/504; 525/73, 74
See application file for complete search history.

(56) References Cited

U.S. PATENT DOCUMENTS

| | | | |
|---|---|---|---|
| 1,765,284 A | 6/1930 | Prosnitz | |
| 3,244,272 A | 4/1966 | Beaman et al. | |
| 4,693,399 A | 9/1987 | Hickman et al. | |
| D303,086 S | 8/1989 | Rothfos | |
| 4,898,292 A | 2/1990 | VerWeyst et al. | |
| 4,925,067 A | 5/1990 | Zemlo et al. | |
| 4,955,513 A | 9/1990 | Bennett | |
| 5,021,515 A | 6/1991 | Cochran | |
| 5,048,730 A | 9/1991 | Forsyth et al. | |
| 5,116,660 A | 5/1992 | Komatsu et al. | |
| 5,153,038 A | 10/1992 | Koyama et al. | |
| D334,143 S | 3/1993 | Rothfos | |
| 5,387,368 A | 2/1995 | Nishimura et al. | |
| 5,399,289 A * | 3/1995 | Speer et al. ............ 252/188.28 | |
| 5,697,533 A | 12/1997 | Shahbazian | |
| 5,700,554 A | 12/1997 | Speer et al. | |
| 5,776,361 A | 7/1998 | Katsumoto et al. | |
| 5,958,821 A | 9/1999 | Ishii et al. | |
| 5,971,231 A | 10/1999 | Samz et al. | |
| D418,760 S | 1/2000 | Blank | |
| 6,037,477 A | 3/2000 | Ishii et al. | |
| 6,037,507 A | 3/2000 | Nakano et al. | |
| 6,254,803 B1 | 7/2001 | Matthews et al. | |
| 6,254,804 B1 | 7/2001 | Matthews et al. | |
| D446,729 S | 8/2001 | Renella et al. | |
| 6,331,333 B1 | 12/2001 | Wu et al. | |
| 6,346,596 B1 | 2/2002 | Mallen et al. | |
| 6,486,265 B1 | 11/2002 | Ishii et al. | |
| 6,559,205 B2 | 5/2003 | Cai et al. | |
| 6,575,323 B1 | 6/2003 | Martin et al. | |
| 6,610,772 B1 | 8/2003 | Clauberg et al. | |
| D480,003 S | 9/2003 | Blades | |
| 6,642,419 B1 | 11/2003 | Miura et al. | |
| 6,732,873 B2 | 5/2004 | Bried et al. | |
| 6,742,666 B1 | 6/2004 | Bried et al. | |
| 6,746,630 B2 | 6/2004 | Rooney | |
| 6,884,366 B2 | 4/2005 | Otaki et al. | |
| 6,958,373 B2 | 10/2005 | Partenheimer | |
| 7,049,359 B2 | 5/2006 | Cochran et al. | |
| 7,183,423 B1 | 2/2007 | Ishii et al. | |
| D542,136 S | 5/2007 | Lilico | |
| 7,255,904 B2 | 8/2007 | Tai et al. | |
| 7,258,930 B2 | 8/2007 | Rivett et al. | |
| 7,332,204 B2 | 2/2008 | Hutchinson et al. | |
| 7,445,169 B2 | 11/2008 | Young et al. | |
| 7,452,601 B2 | 11/2008 | Ebner et al. | |
| 7,479,326 B2 | 1/2009 | Share et al. | |
| 7,521,523 B2 | 4/2009 | Jenkins et al. | |
| D597,409 S | 8/2009 | Ruybal | |
| 7,608,341 B2 | 10/2009 | Tsuji et al. | |
| 7,740,926 B2 | 6/2010 | Tung et al. | |
| 7,754,798 B2 | 7/2010 | Ebner et al. | |
| 7,759,515 B2 | 7/2010 | Ishii et al. | |
| 2002/0058196 A1 | 5/2002 | Kanga | |
| 2003/0012904 A1 | 1/2003 | Hutchinson et al. | |
| 2003/0183801 A1 | 10/2003 | Yang et al. | |
| 2004/0071885 A1 | 4/2004 | Hutchinson et al. | |
| 2004/0099840 A1 | 5/2004 | Horsham et al. | |
| 2004/0118846 A1 | 6/2004 | Merolla | |

(Continued)

FOREIGN PATENT DOCUMENTS

JP H05156095 A 6/1993
WO 2008127542 A1 10/2008

OTHER PUBLICATIONS

Gregory A. Loraine, "Oxidation of Polyvinylpyrrolidone and an Ethoxylate Surfactant in Phase-Inversion Wastewater," Water Environment Research, Apr. 2008, vol. 80, No. 4, pp. 373-379.

Jeremy M. Baskin et al., "Copper-free click chemistry for dynamic in vivo imaging," Proceedings of the National Academy of Sciences of the United States of America, Oct. 23, 2007, vol. 104, No. 43, pp. 16793-16797.

(Continued)

*Primary Examiner* — Jeffrey Mullis (74) *Attorney, Agent, or Firm* — Fitch, Even, Tabin & Flannery LLP (57) ABSTRACT

An oxygen scavenging polyolefin composition and methods of making thereof are described herein. In one approach, the composition includes a continuous non-polar polyolefin matrix having oxygen scavenging domains dispersed therein. The oxygen scavenging domains include an oxidizable polymer, a transition metal catalyst or salt thereof, and a catalytic promoter effective to bind with oxygen passing through the continuous non-polar polyolefin matrix. The oxygen scavenging domains forming a discrete polar region within the continuous non-polar polyolefin matrix. The composition further includes a polymeric compatibilizer having a polar moiety and a non-polar moiety and in amounts effective to uniformly disperse the polar oxygen scavenging domains in the continuous non-polar polyolefin matrix.

15 Claims, 3 Drawing Sheets

(56) References Cited

U.S. PATENT DOCUMENTS

| | | |
|---|---|---|
| 2005/0118371 A1 | 6/2005 | Shi et al. |
| 2005/0260371 A1 | 11/2005 | Shi et al. |
| 2006/0148957 A1 | 7/2006 | Stewart et al. |
| 2006/0257603 A1 | 11/2006 | Shi et al. |
| 2008/0014224 A1 | 1/2008 | Boyd et al. |
| 2008/0044605 A1 | 2/2008 | Lee et al. |
| 2008/0045637 A1 | 2/2008 | Stewart et al. |
| 2008/0073311 A1 | 3/2008 | Jelich et al. |
| 2008/0255280 A1 | 10/2008 | Sims et al. |
| 2009/0061061 A1 | 3/2009 | Beckwith et al. |
| 2011/0056947 A1 | 3/2011 | White et al. |
| 2011/0159193 A1 | 6/2011 | Yoon et al. |
| 2011/0275742 A1 | 11/2011 | Akkapeddi et al. |
| 2012/0283366 A1 | 11/2012 | Akkapeddi et al. |

OTHER PUBLICATIONS

Yasutaka Ishii et al., Alkane Oxidation with Molecular Oxygen Using a New Efficient Catalytic System: N-Hydroxyphthalimide (NHPI) Combined with Co(acac)n (n = 2 or 3), The Journal of Organic Chemistry, 1996, vol. 61, Issue 14, pp. 4520-4526 (Abstract, 1 page).

* cited by examiner

OXYGEN SCAVENGER SYSTEM IN A POLYOLEFIN MATRIX

FIELD

Oxygen barrier polymers and, in particular, polyolefins with active oxygen scavenging systems.

BACKGROUND

Limiting the exposure of oxygen-sensitive materials to oxygen can help improve the shelf life of many products, such as foods, beverages, and pharmaceuticals to suggest but a few. Polypropylene (PP) and polyethylene (PE) are common commodity polymers used for films and other plastic packaging. These polymers tend to have good moisture barrier properties, but are quite permeable to oxygen. In order to impart oxygen barrier characteristics to packaging using such commodity polymers, a barrier material or layer is often included as part of the packaging. For instance, ethylene vinyl alcohol (EVOH), nylon, metal films and other oxygen barrier layers may be combined with the PP or PE as a separate layer to form a multi-layer film or package. In a packaging film structure, however, using such additional barrier layers to block passage of oxygen tends to result in a relatively thick multilayer film. In many instances, for example, to impart oxygen barrier characteristics to a polypropylene or polyethylene film, an EVOH or nylon layer is adhered to polypropylene or polyethylene in a five layer laminate using adhesive tie layers to secure the EVOH or nylon to the polypropylene or polyethylene. One exemplary prior film laminate includes the following layers (in order): PP/tie/EVOH/tie/PP layers; or PE/tie/EVOH/tie/PE layers. Such thick laminates can be costly, limit packaging applications, and can limit the ability to recycle the films due to the EVOH or nylon components. Such prior oxygen barrier materials are considered passive products because they are configured to block the passage of oxygen through a film or other packaging material.

Other attempts to limit oxygen exposure to oxygen-sensitive materials uses oxygen scavenger materials. Oxygen scavenger materials form an active barrier because the oxygen scavenger does not necessarily block passage of oxygen, but is configured to react with and bind oxygen as it permeates the film or package. It is common to use a polyamide-metal catalyst oxygen scavenging system in polyesters to achieve an oxygen barrier. A common polyamide (monomers of amide groups in the polymer) is poly(m-xylene adipamide), which is commercially known as MXD6. However, while the polyamide-based oxygen scavengers work well in polyester (such as PET), they tend not to be compatible or miscible in many other polymers used for packaging. For example, MXD6 tends not to be compatible or miscible in polyolefins like polypropylene and polyethylene. Other known oxygen scavenging materials also tend not to be compatible or miscible with polyolefin materials. Incompatible materials may form multiple phase or non-uniform blends. It is believed that non-uniform dispersions of the oxygen scavenging materials in a polymer tend to limit the oxygen scavenging capability of existing chemistries when combined with polyolefin materials.

The oxygen scavenging films often include a catalyst, and in some instances, a co-catalyst in combination with an oxidizable substrate. In addition to the incapability of prior oxygen scavenging materials with polyolefin polymers, the catalyst and co-catalysts used with oxygen scavenger chemistries may not be sufficiently robust to be incorporated into a monolayer polyolefin film using conventional film extrusion or molding processing. Often the oxygen scavenging composition cannot withstand the harsh processing and thermal conditions of a film extrusion process or molding process. Many components suitable for an oxygen scavenging system, even if compatible with the desired film forming polymers, may decompose or degrade at the temperatures typically used to form these polymers into films or molded structures. The decomposed or degraded materials tend not to function efficiently as a catalyst or co-catalyst.

SUMMARY

Active oxygen barriers or oxygen scavenging systems are disclosed for polyolefin compositions. In one aspect, an active oxygen barrier is provided that utilizes oxygen scavenging compounds dispersed in a polymer system, such as a polyolefin matrix. In another aspect, incorporation of such chemistries within a packaging film polymer matrix, such as multi or single layer films are also provided. For example, the components of the oxygen scavenging systems may be homogeneously dispersed in single layer or multi-layer polyethylene or polypropylene and are sufficiently robust to withstand the thermal exposures of a film extrusion process and retain high levels of oxygen scavenging activity in the formed polymer matrix.

By one approach, an oxygen scavenging polyolefin composition is provided. The composition includes a continuous non-polar polymeric matrix including a polyolefin. Oxygen scavenging domains are dispersed in the continuous non-polar polymeric matrix. The oxygen scavenging domains include an oxidizable polymer, a transition metal catalyst or salt thereof, and a catalytic promoter effective to scavenge oxygen passing through the continuous non-polar polymeric matrix. In this approach, the oxygen scavenging domains form a discrete polar region within the continuous non-polar polymeric matrix. The composition also includes a polymeric compatibilizer in the continuous non-polar polymeric matrix. The polymeric compatibilizer has a polar moiety and a non-polar moiety and is provided in amounts effective to uniformly disperse the polar oxygen scavenging domains in the continuous non-polar polymeric matrix. In some forms of the compositions herein, about a 450 to about a 6800 fold decrease in oxygen transmission through a polyolefin film can be exhibited over a neat monolayer polyolefin film.

In another approach, a method is provided to retain high activities of the oxygen scavenging compounds after exposure to thermal processing conditions of an extrusion or molding process. The method includes first blending an oxygen scavenging polymer, a catalyst or salt thereof, a catalytic mediator, and a polymeric compatibilizer having a polar moiety and a non-polar moiety to form a master batch thereof. Next, the blended master batch is added to a non-polar polymer composition including a polyolefin. The blended polyolefin material is then extruded or molded to form the oxygen scavenging polyolefin composition. The formed composition has discrete polar regions of the oxygen scavenging polymer, catalyst or salt thereof, and catalytic mediator formed with a continuous non-polar polymeric matrix including the polyolefin and the polymeric compatibilizer.

DETAILED DESCRIPTION

The present disclosure provides for active oxygen barrier systems that incorporate oxidizable components uniformly into a polyolefin composition to impart oxygen barrier characteristics into polyolefin polymers and non-polar polymer compositions including polyolefins that were previously highly permeable to oxygen. The compositions herein with the active oxygen barrier system can then be formed into a desired product, such as mono-layer films, packaging, and other substrates requiring oxygen barrier properties. The active oxygen barrier systems of the present disclosure, rather than blocking the passage of oxygen, utilize a chemical reaction that scavenges or bonds with oxygen to bind oxygen attempting to pass through the polyolefin composition. The compositions herein can provide about a 450 to about a 6800 fold decrease in oxygen transmission through a polyolefin film as compared to a neat polyolefin material.

In one aspect, the oxygen scavenger materials are compatible with and uniformly disperse in a polyolefin or polyolefin composition in a manner to provide high levels of oxygen scavenging due, in part, to the selection of and effective amounts of a polymeric compatibilizer or agent blended with the polyolefin. In another aspect, the oxygen scavenger materials of the present disclosure are configured to and/or are processed in a manner to withstand the harsh thermal conditions of a polyolefin film extrusion or molding process and still retain high levels of oxygen scavenging activity after experiencing high processing temperatures. That is, the oxygen scavenging materials are maintained and not degraded after experiencing the high temperatures of a film extrusion or other polymer process. The oxygen scavenging systems herein are advantageous because they allow commodity polyolefin materials, such as polypropylene or polyethylene (which are highly permeable to oxygen), to be formed into a mono-layer film or other structure and exhibit oxygen scavenging capabilities to provide a film or package with high oxygen barrier properties.

In the first aspect, this disclosure provides for a polyolefin composition having oxygen scavenging capabilities. By one approach, the polyolefin composition includes a continuous non-polar polymeric matrix, composition, or base including a polyolefin with small and uniformly dispersed oxygen scavenging domains dispersed therewithin. The continuous non-polar polymer matrix may be a continuous non-polar polyolefin matrix providing a base polymer in the composition. The continuous polymeric matrix or composition may be a blend of polymers (including polar and non-polar polymers) as long as it is predominately non-polar. The base polymer or polyolefin may be or include any polyolefin with a high degree of oxygen permeability (without the scavengers), such as a polypropylene, polyethylene, their copolymers and the like. The dispersed domains include the oxygen scavenging materials (for instance, an oxidizable substrate or polymer, a catalyst, and any catalytic promoter(s)) within discrete domains or regions surrounded by the continuous non-polar polymer matrix. In general, the oxygen scavenging materials are polar in nature; thus, the polymer matrix may also include effective amounts of a polymeric compatibilizer or agent configured to and in effective amounts to uniformly disperse the polar oxygen scavenging materials as the relatively small discrete domains or regions in the continuous non-polar polymeric matrix.

In general, oxygen scavenging chemistries tend to be highly polar materials, which helps explain why they were easily compatible with prior polyester materials (such as PET) that also are polar materials. That is, polar materials tend to be compatible with other polar materials. The polyolefin compositions used in the present disclosure, on the other hand, include a non-polar matrix or base polymer that, because of its non-polar nature, is generally incompatible with polar oxygen scavenging compounds. The discovered polymeric compatibilizer or agent used in some approaches of the polyolefin compositions herein is effective to render polar oxygen scavenging materials compatible with the non-polar polyolefin materials and the continuous non-polar polymer matrix.

It is believed that oxygen is scavenged upon contacting one of the oxygen scavenging domains as oxygen passes through the permeable polyolefin material. The polymeric compatibilizer or agent is configured to and in an amount effective to form a large number of uniformly dispersed and very small domains or regions of the oxygen scavenging chemicals in the continuous non-polar polymeric matrix to achieve the high level of oxygen scavenging. The selection and amounts of compatibilizer identified herein results in a polyolefin composition with a high percentage of small oxygen scavenging domains or discrete regions dispersed throughout the polyolefin composition. This composition increases the tendency of oxygen passage through the polymer to contact one of the domains where it is scavenged in a chemical reaction. If there are not enough of the domains, if the domains are not small enough, or if the domains are not uniformly dispersed within the polyolefin composition, then it is believed that the oxygen can simply pass through the polyolefin without being scavenged because the oxygen molecules would have less of a chance for contacting an oxygen scavenging domain.

Turning to more of the specifics, the continuous non-polar polymer matrix includes, by one approach, a polyolefin base as the continuous polymer. Polyolefin materials tend to be non-polar and highly permeable to oxygen. For instance, the continuous non-polar polymer matrix or the polyolefin base forming the matrix (that is, a neat polyolefin without the oxygen scavenging materials) may have an oxygen transmission rate (OTR) greater than about 900 cc of oxygen per $m^2$ per day of material at about 72° F. and about 50 percent relative humidity (by some approaches, greater than about 2000 $cc/m^2$-day and in other approaches about 900 to about 2000 $cc/m^2$-day or greater). In some approaches, the continuous non-polar polymer matrix may be formed entirely by a continuous polyolefin phase.

By one approach, the polyolefin in or used as the continuous non-polar polymer matrix may be any melt flowable polymer, such as any polyolefin capable of being formed into a film, and that is highly permeable to oxygen. By one approach, the polyolefin may be polypropylene or polyethylene and the like, or various co-polymers of polypropylene and/or polyethylene. By one approach, the oxygen scavenging polyolefin composition includes about 20 to about 95 weight percent of a polyolefin (in other approaches, about 30 to about 90 weight percent, and in yet other approaches, about 40 to about 90 weight percent) as the base polymer forming the continuous non-polar polymer matrix. In yet other approaches, the composition may include about 50 to about 95 percent of a polyolefin, and in some cases, about 70 to about 95 percent of a polyolefin. In yet other approaches, the above percentages may refer to a blend of polymers or co-polymers forming the continuous composition. In such case, the polymer blend may include various polar and/or non-polar polymers as long as the blend is predominately non-polar in nature. For example, the continuous polymer composition may be about 75 to about 100 percent non-polar polymer with minor amounts of polar polymers or co-polymers blended or otherwise combined therewith. For instance, the continuous non-polar polymer composition (in some approaches) may include minor amounts (such as less than about 25 percent, in some approaches, between about 1 and about 20 percent, and in other approaches, between about 1 and about 10 percent) of co-polymers such as ethylene vinyl acetate (EVA), ethylene acrylic acid (EAA), and ethylene-methyl methacrylate (EMMA) as well as other film forming polar polymers. The non-polar polymer matrix may also be copolymers of PP and PE as long as the copolymers are predominately non-polar in nature as described above. Copolymers of PE and PE may contain propylene, ethylene or butane, hexane, and octane monomers in the formation of the copolymers or copolymers with ethylene-vinyl acetate or acrylic moieties.

The polymeric compatibilizer or agent used in some approaches of the polymer compositions herein includes a compound with polar moieties and non-polar moieties effective to render the non-polar continuous polymer matrix compatible with polar oxygen scavenging materials. By one approach, the polymeric compatibilizer has a non-polar polymeric backbone or base with a grafted carboxylic acid group thereon forming the polar moiety. For instance, the polymeric compatibilizer may be an acrylic grafted polyolefin or polyolefin copolymer. The grafted acrylic portion provides the polar moiety compatible with oxygen scavenging components, and the base polyolefin portion provides the non-polar moiety compatible with the continuous non-polar polymer matrix. The grafted acrylic portion may includes the carboxylic acid, which may be a di-carboxylic acid. In another approach, the polymeric compatibilizer may be a maleic anhydride grafted polymer, such as a maleic anhydride grafted polypropylene or polyethylene. In yet another approach, the polymeric compatibilizer may be an acrylic acid grafted polypropylene or polyethylene. The base polymer of the polymeric compatibilizer is generally selected based on the majority component of the continuous non-polar polymer matrix. That is, for example, if the continuous non-polar polymer matrix includes a majority of a polyethylene, then the base polymer of the polymeric compatibilizer is also a polyethylene. If the continuous non-polar polymer matrix includes a majority of a polypropylene, then the base polymer of the polymeric compatibilizer is also a polypropylene and so on.

Selection and amounts of the polymeric compatibilizer aids in forming a high number of small and uniformly dispersed oxygen scavenging domains in the continuous non-polar polymer matrix. By one approach, the oxygen scavenging polymer composition or the final polymer matrix includes about 1 to about 50 weight percent of the compatibilizer, in other approaches, about 5 to about 30 weight percent, and in yet other approaches, about 10 to about 25 weight percent. In yet other approaches, the composition may include about 1 to about 30 percent, and in some cases, about 1 to about 20 percent of the compatibilizer. Selection of the amount of the grafted, polar moiety in the compatibilizer also aids in effective dispersion of the oxygen scavenging domains. By one approach, the compatibilizer may include from about 0.1 to about 6 percent of the grafted moiety. In another approach, the compatibilizer may include about 0.2 to about 2 percent of the grafted moiety, and in yet another approach, about 0.2 to about 1.5 percent of the grafted moiety, and in yet other approaches, about 1 to about 2 percent, in further approaches, about 1.2 to about 1.5 percent of the grafted moiety such as maleic anhydride to achieve the desired size, uniformity, and dispersion of the domains to achieve effective oxygen scavenging.

While not wishing to be limited by theory, it is believed that the polymeric compatibilizer forms a bridge, link, or interface between the polar oxygen scavenging domains and the non-polar polymer phase that enables the oxygen scavenging domain to be uniformly dispersed in the polymer matrix. By one approach, it is believed that the polar moiety of the compatibilizer may surround a polar oxygen scavenging domain or portions thereof with the non-polar moiety extending away from the domains helping to disperse with the continuous non-polar polymer phase. That is, the polar moiety of the compatibilizer may be at an interface of the domains and the continuous polymer matrix while the non-polar moiety may then extend outwardly into the polymer matrix. Such arrangement may be effective to allow the polar oxygen scavenging domains to form a relatively small size and be uniformly dispersed at a high level in the continuous polymer phase.

Figure 1:
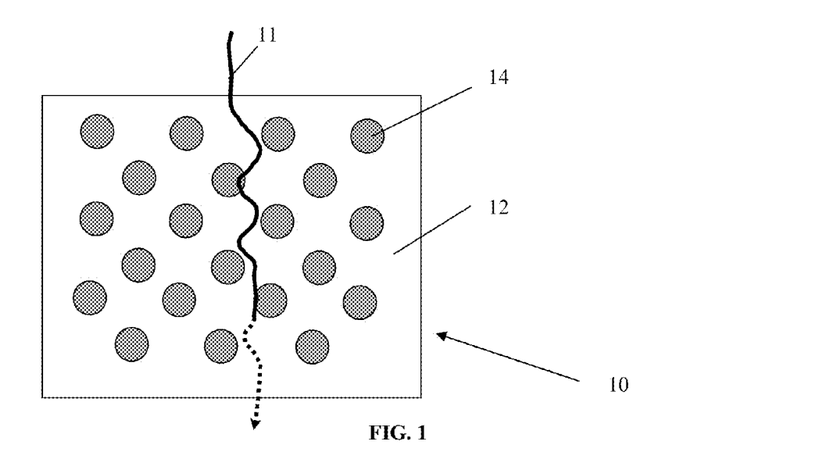
FIG. 1 is a schematic of a polyolefin matrix with dispersed oxygen scavenging domains.

The dispersed oxygen scavenging domains or regions may include an oxidizable substrate or polymer, a catalyst, and a mediator or catalyst promoter. By one approach, the dispersed domains are very small and uniformly dispersed throughout the continuous non-polar polymer matrix due to, in part, selection and amount of the polymeric compatibilizer or agent as discussed above. It is believed that the small size and uniform dispersion of the oxygen scavenger domains helps aid in achieving the high oxygen scavenging capabilities of the polyolefin polymers. Turning to FIG. 1 for a moment, an exemplary polyolefin composition 10 is illustrated showing how oxygen 11 may be scavenged as it passes through the material. For instance, as oxygen 11 permeates a continuous polymer matrix 12, it is scavenged when it contacts or engages one of the domains 14. It will be appreciated that FIG. 1 is an exemplary representation and not intended to be limiting in size, shape, uniformity, or in any other capacity. Thus, relatively small and uniformly dispersed domains 14 are very effective in achieving a high level of oxygen scavenging in the polyolefin materials. In one approach, the oxygen scavenging domains may be about 15 nm to about 10 microns in size (in some approaches, about 0.1 microns to about 10 microns, in other approaches, about 0.1 microns to about 2 microns, and in other approaches, about 1 micron to about 2 microns in size). In yet other approaches, the domains may be about 15 nm to about 5 microns, and, in other cases, about 15 nm to about 1 micron in size. In yet other approaches, the domains may be about 15 to about 200 nm in size. In another approach, the polyolefin composition or the continuous non-polar polymeric matrix thereof may include about 100 to about 400 oxygen scavenging domains or regions uniformly dispersed per about 500 to about 1000 square microns (in other approaches, about 800 to about 1000 square microns, and in other approaches, about 800 to about 900 square microns) of the continuous non-polar polymer matrix. In other approaches, about 120 to about 320 domains (in yet other approaches about 140 to about 300 domains) uniformly dispersed per unit area is effective to achieve oxygen scavenging in the polymer compositions herein.

While not wishing to be limited by theory, it is believed that oxygen is scavenged or consumed when it engages or comes into contact with one of the domains as it passes through the polymer matrix. Thus, a high level of small and uniformly dispersed domains helps achieve the high level of scavenging found herein. Large sizes of the domains or non-uniform dispersions (so there are large pockets or areas of polymer without a domain) are believed to permit passage of oxygen through the composition that is not scavenged because it would not contact one of the oxygen scavenging domains.

The dispersed domains may include the oxidizable substrate or polymer and any catalysts or mediators. By one approach, the domains include the oxidizable substrate or polymer with a repeating hydrocarbon base and a grafted moiety thereon, a transition metal or a salt thereof as the catalyst, and an imide compound or an ester derivative thereof as a mediator or catalyst-promoter. The promoter in combination with a catalyst may be included in the system to shorten an induction period for the oxidization reactions and increase the rate of scavenging. An induction period is the length of time before the composition begins scavenging oxygen. In another approach, the catalyst and promoter are in a form configured to withstand the thermal conditions of film extrusion and retain their activity after exposure to temperatures up to about 230° C. and, in some cases, between about 180° C. to about 230° C.

By one approach, the oxidizable substrate or polymer may include a non-cyclic aliphatic hydrocarbon as a polymeric base or backbone with grafted or branched substituents thereon. The non-cyclic aliphatic polymeric base may include repeating units having a secondary carbon atom, such as repeating alkyl units. The substituents or grafted portion may include an amino group and a carbonyl group, such as a grafted amide or cyclic amide moiety. By one approach, the grafted amide moiety is a lactam ring such as pyrrolidone. For example, the oxidizable substrate may be polyvinyl pyrrolidone (PVP). By one approach, the oxygen scavenging polymer composition or polymer matrix thereof may include about 1 to about 40 percent (in some approaches, about 5 to about 30 percent, in other approaches about 10 to about 25 percent) of the oxidizable substrate (such as PVP), which when combined with the compatibilizer discussed above, will tend to contain the PVP in the oxidizable domains. In some cases, the oxidizable substrate or polymer may have a molecular weight of about 2,500 to about 2,500,000 and in some cases, about 40,000 to about 400,000.

The catalyst may be a transition metal or a salt thereof. By one approach, the transition metal may be selected from the first, second or third transition series of the Periodic Table. For instance, effective transition metals may include, but are not limited to, manganese, iron, cobalt, nickel, copper, rhodium, and ruthenium. By one approach, the metal is cobalt. Suitable counterions for the metal include, but are not limited to, chloride, acetate, oleate, stearate, palmitate, 2-ethylhexanoate, neodecanoate, or naphthenate. In another approach, salts may include cobalt naphthenate or cobalt neodecanoate. By one approach, the catalyst may be cobalt and, in particular, cobalt neodecanoate. By one approach, the polyolefin composition or polymer matrix thereof includes about 500 to about 9000 ppm of the catalyst, in another approach, about 500 to about 5000 ppm of the catalyst, and in yet another approach, about 500 to about 4000 ppm of the catalyst and yet in other approaches, about 500 to about 1000 ppm. The catalyst is also contained in the oxygen scavenging domains. While not wishing to be limited by theory, it is believed that in some approaches the scavenging ability of the PVP is generally independent of cobalt loading and, in some approaches, occurs only in with the presence of the catalytic promoter or mediator discussed further below.

The mediator may be a hydroxyl imide or an ester derivative of the hydroxyl imide or other source of N-oxyl radicals. The hydroxyl imide may be a cyclic hydroxyl imide such as a hydroxyl phthalimide, hydroxyl succinimide, N,N',N" trihydroxyisocyanuric acid or the like as well as substituted analogs thereof. In one approach, the hydroxyl imide compound is N-hydroxylphthalimide (NHPI). By one approach, the oxygen scavenging polymer composition or polymer matrix thereof may include about 0.5 to about 20 percent of the mediator, in other approaches, about 1 to about 8 percent, and in yet other approaches, about 1 to about 5. In yet other approaches, the composition may include about 1 to about 15 percent, and in other approaches, about 1 to about 10 percent of the mediator.

In some approaches, the hydroxyl imide mediator may not withstand the thermal processing conditions of a film or other polymer processing. For instance, NHPI may degrade upon exposure to temperatures used in common polyolefin film processing extrusion lines. Upwards of 50 percent of NHPI may degrade upon exposure of temperatures between about 180° F. to about 250° F. Degradation of the NHPI negatively effects to oxygen scavenging capabilities of the systems herein. Thus, by one approach, the hydroxyl imide may be an ester derivative or precursor thereof, which is capable of withstanding the high temperature exposures of a film extrusion process. By one approach, the ester derivative may be an acetyl or an o-acetyl such as an acetoxy derivative of the imide mediator. By another approach, the derivative is HNPI acetate. While not wishing to be limited by theory, it is believed that the ester derivative may help retain or maintain the integrity of a ring or cyclic structure on the imide mediator. It has been discovered that about 70 to about 99 percent, in some cases, about 80 to about 95 percent, and in other cases, about 90 to about 95 percent of the ester derivative withstands or can be maintained in the domains after the film extrusion process. Thereafter, the ester derivative of the mediator can be activated into a mediator form upon exposure to moisture, for example, and transforms to or releases by hydrolysis the hydroxyl imide. In some approaches, it is believed that moisture in the air helps activate the ester derivative slowly over time. Relative humidities from about 30 to about 50 percent may provide suitable moisture to activate or hydrolyze the hydroxyl imide to the non-esterified form.

The ester derivative of the imide mediator may be advantageous not only because it permits the mediator to withstand the thermal conditions of polymer processing, but may also extend the oxygen scavenging capability of the composition. The ester derivative may convert to or release the non-esterified form slowly over time by hydrolysis, for example, upon exposure to a water source such as the natural humidity in the air. This mechanism tends to permit a slow release of the imide mediator available to help catalyze the reactions over a long period of time. In addition, such derivative of the mediator may be helpful to minimize consumption of the oxidizable components in a short period of time and extend the useful scavenging life of the compositions herein. Such functionality may also be advantageous, in some approaches, if the oxygen scavenging polymer composition is produced in a humidity controlled environment where the humidity is low enough (for example below about 30 percent, in some cases below about 20 percent, and in other cases, below about 15 percent RH at about 20 to about 45° C.) to retard or minimize hydrolysis of the ester derivative of the mediator. Then, when the composition is exposed to ambient air, such as after being used to package an oxygen sensitive product, the package will become active to scavenge oxygen. For example, the compositions herein may not because sufficiently active until after they are formed into a suitable package and exposed to an uncontrolled humidity environment. In this manner, scavenging may be retarded or minimized in the composition until it is needed when used to package an oxygen sensitive material.

While the oxidization reaction of the oxidizable substrate or polymer is not exactly known, it is believed (while not wishing to be limited by theory) that the mediator and catalyst may facilitate oxidization of the carbon chain in the backbone of the oxidizable substrate. In addition, when an amide or cyclic amide is supplied as a substituent in the oxidizable substrate, the carbon-nitrogen bond or even a breaking of the carbon-carbon bond in the amide ring may also be (or even in addition to) the oxidization reaction site in the oxidizable components herein. In some approaches, this reaction may include a phthalimide N-oxyl radical generated from NHPI and molecular oxygen when combined with a cobalt catalyst. Again, while not wishing to be limited by theory, a possible reaction product may be a ketone, alkanone, or derivative thereof. In some approaches and again not wishing to be limited by theory, it is believed that the possible multiple oxidizable sites in both the backbone and substituents of the oxidizable polymer or substrate herein may help achieve the high levels of oxygen scavenging in polyolefins especially in the approaches that utilize the compatibilizer.

In some cases, the oxygen scavenging polymer composition achieves an oxygen transmission rate (OTR) of about 1.8 $cc/m^2/day$ or lower and, in some cases, down to about 0.021 $cc/m^2/day$. In other cases, the OTR is between about 6 and 0.02 $cc/m^2/day$, and in other approaches about 1.8 to about 0.02 $cc/m^2/day$. It is also believed that such transmission rates are achievable at refrigerated temperatures (about 37 to about 41° F.) and freezer conditions (about −10 to about 0° F.).

In the second aspect, this disclosure provides for an oxygen scavenging system that retains a high degree of scavenging activity even after exposure to elevated temperatures that tend to degrade prior oxygen scavenging materials. Thus, the compositions herein are suitable to form mono-layer polymer films and packaging structures because the scavenging materials can be incorporated into the polymer base and processed in conventional film extrusion equipment or molding processes and still maintain or retain a high level of scavenging activity after exposure to the high temperatures of these polymer processes. By one approach, the mono-layer films or polymer substrates may be about 0.1 to about 100 mils thick (in another approach, about 2 to about 80 mils thick, and in yet another approach, about 10 to about 40 mils thick and, in yet other approaches, about 2 to about 14 mils thick.)

This monolayer film can be used alone, or can be converted by printing, lamination or coating to combine with other films to form the final film structure with optional printed graphics and effective sealant layers.

As mentioned above, retention of scavenging activity may be through selection of reaction components that are in a form capable of withstanding higher temperature exposures. The components may then be converted to or release the effective catalyst or mediator components over time, such as by hydrolysis of an ester derivative or precursor of the catalytic mediator. This approach was discussed in detail above.

In another approach, retention of scavenging activity may also be through careful selection of processing conditions and temperatures, which may, in some approaches, also be in combination with the material selection discussed above. In this approach, particular processing or compounding procedures may be selected to minimize the thermal degradation of the NHPI and cobalt catalyst or other catalysts and mediators. In one example of this approach, the oxygen scavenger materials may be first separately melt compounded in an extruder to form an oxygen scavenger mixture. Temperatures used to process an oxygen scavenger mixture would be from about 100 to about 200° C. The polymer used to form the continuous non-polar matrix and optional compatibilizer may then be separately melt-compounded in a different extruder to form a base polymer portion. Temperatures used to process the base polymer portion may be about 150 to about 220° C. The two extrudates (oxygen scavenger portion and base polymer portion) may then be melt-compounded together to form the oxygen scavenger polymer matrix. Temperatures of the combination extrusion may be about 130 to about 220° C. By one approach, the oxygen scavenger chemicals are heated two separate times, but the first heating process uses relatively low temperatures and minimizes or avoids degradation. When the oxidization materials are combined with the polymers and exposed to higher temperatures, they are in smaller quantities and believed to be less susceptible to thermal damage.

By another approach, the compounding procedure may also include preparing a master batch of the oxidizable substrate (such as PVP) along with the oxidizable components and compatibilizer. Then, the master batch is combined with the polymers used to form the continuous non-polar polymer matrix. In this approach, the master batch can be processed at lower temperatures, such as about 150 to about 180° C. to form a melt compound of the compatibilizer with the oxygen scavenging compounds. Then, the master batch may be combined with the polymers for the polymer matrix and processed at higher temperatures such as about 200 to about 250° C. (in some cases about 200 to about 230° C.). While not wishing to be limited by theory, by forming a master batch of the compatibilizer with the oxidizable materials, the compatibilizer protects the oxidizable components in the later higher temperature processing. The compatibilizer may surround or form an interface around the oxidizable materials that may also later help form the small and uniform domains in the matrix as discussed above.

By one approach, the master batch may include about 2 to about 20 percent compatibilizer (such as maleic anhydride polyolefin), about 50 to about 90 percent oxidizable substrate or polymer (such as PVP), about 2 to about 20 percent mediator or catalytic promoter (such as NHPI or a derivative thereof), and about 2 to about 20 percent catalyst (such as cobalt neodecanoate.) Then, in some approaches, about 5 to about 50 percent of the master batch may be combined with a polyolefin (such as polyethylene or polypropylene) to form the oxygen scavenging polyolefin compositions herein.

The following examples are included to illustrate the disclosure herein and not to limit it. Unless otherwise stated, all parts and percentages are by weight.

EXAMPLES

Example 1

An evaluation of oxygen scavenging capabilities of an active oxygen barrier system was performed utilizing N-methylpyrrolidone (NMP), a cobalt naphthenate (CoNf2) catalyst and N-Hydroxyphthalimide (NHPI) as a mediator in static conditions with OxySense monitoring of oxygen concentration in a headspace. The experimental setup included an OxySense headspace oxygen monitoring system Model 4000B (OxySense Inc., Dallas, Tex.) and 76 mL jars (tightened, parafilmed). Testing was conducted in accordance to ASTM F-2714. In this experiment, the scavenging rate was evaluated (not the total capacity). The experiment was carried out in static conditions (no mixing) to model performance in the film.

Figure 2:
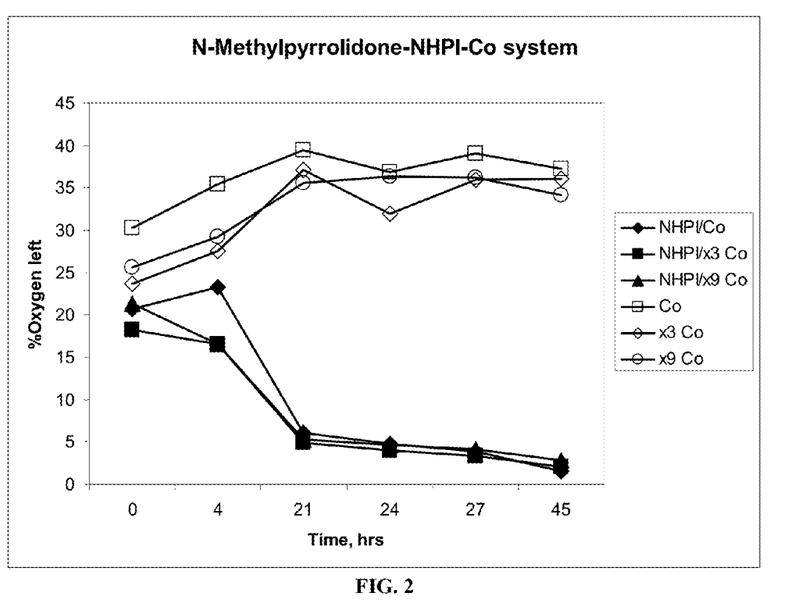
FIG. 2 is a graph of oxygen scavenging.

FIG. 2 shows a plot of percent oxygen left in the container relative to time exposure for the N-methylpyrrolidone substrate as the oxidizable substrate. In this evaluation, N-methylpyrrolidone was used as a solvent. N-methylpyrrolidone is a chemical compound with a 5-membered lactam structure. It is a clear to slightly yellow liquid miscible with water and solvents like ethyl acetate, chloroform, benzene, and lower alcohols of keton. About 5 ml of NHPI with CoNf2 as a catalyst in a weight ratio of 1:0.1 of NHPI to CoNf2 were added to the solvent. The amount of NHPI was about 0.1 mmol. In this instance, it was observed that scavenging occurred only in the presence of Co and NHPI as shown in the graph of FIG. 2 that also tested cobalt with no NHPI. The scavenging rate appears to be independent of cobalt load. The study measured three times and nine times the cobalt loading as shown in FIG. 2 (i.e. NHPI to catalyst ratios of 1:0.1; 1:0.3 and 1:0.9). It was observed that the induction period is about five times longer than in volumetric system with efficient stirring, but relatively fast after the induction period, with complete absorption observed over time. Induction period (the onset of scavenging) was about 4 hours.

Based on this evaluation, it is believed that NMP may be an effective substrate for oxygen scavenging. This evaluation also suggested that Polyvinylpyrrolidone (PVP) could be used as oxygen scavenging polymers in films.

Example 2

This experiment measures the level of oxygen scavenging of PVP within a polymer matrix. In this experiment, polystyrene was the polymer matrix. Various films were prepared as set forth in Table 1 below. For polypropylene or polystyrene-based examples, a master batch as described herein was first extruded at about 185° C. Then, the masterbatch was compound extruded with the polymer at about 195° C. and films were prepared by compression molding at about 180° C. For polyethylene-based film, a master batch as descried above was first extruded at about 150° C. Then, the master batch was extruded at about 150° C. with the polyethylene and then films were prepared by compression molding at about 160° C. Film samples prepared ranged from about 10 to about 14 mils thick.

In a first study, polystyrene was used as the base polymer or polymer matrix portion. While polystyrene was used for the first portion of this Example, it is believed that similar results would occur with polyolefins. Oxygen transmission was tested using an oxygen transmission rate measurement system from Modern Control, Inc. (Minneapolis Minn.). All testing was conducted in accordance to ASTM D-3985 and reported in oxygen transmission (OTR) through the films in cc/($m^2$-day) at 72° F. and 50 percent relative humidity over a time frame spanning about 1 to about 21 days.

TABLE 1

| Base Polymer | Oxidizable Substrate | Catalyst | Mediator | OTR |
|---|---|---|---|---|
| 100% Polystyrene (PS) | — | — | — | >2000 |
| 81% PS | 19% PVP | — | — | >2000 |
| 77% PS | 18% PVP | 50000 ppm Cobalt | — | 310, 310, 320 |
| 73.5% PS | 17.5% PVP | 45000 ppm Cobalt | 4.5% NHPI | 3.86 to 6.5 |
| 73.5% PS | 17.5% PVP | 45000 ppm Cobalt | 4.5% NHPI-AC | 220, 230, 240 |

The films include (if applicable) about 0.5 to about 0.6 grams of polystyrene, about 0.12 to about 0.14 PVP, about 30 to about 40 mg of cobalt, and about 30 to about 40 mg of a mediator. Higher loading of PVP tends to lead to more brittle films.

The PVP scavenger systems (PVP, cobalt, and NHPI similar to the table above) were then tested in three layer polyethylene films as provided in Table 2 below. In these films, the oxygen scavenging component (layer 2) was sandwiched between two layers of high density polyethylene.

TABLE 2

| Layer 1 | Layer 2 | Layer 3 | Total Thickness, um | Estimated thickness of Layer 2, um * | OTR |
|---|---|---|---|---|---|
| HDPE | — | — | 27 | 0 | 900-913 |
| HDPE | — | HDPE | 27 | 0 | 450 |
| HDPE | PVP, Cobalt, NHPI | HDPE | 313 | 259 | 34 |
| HDPE | PVP, Cobalt, NHPI | HDPE | 313 | 259 | 39-44 |
| HDPE | PVP, Cobalt, NHPI | HDPE | 313 | 259 | 34-38 |
| HDPE | PVP, Cobalt, NHPI | HDPE | 313 | 259 | 24-28 |
| HDPE | PVP, Cobalt, NHPI | HDPE | 313 | 259 | 40 |

* before press molding

It was observed that while the dispersion of the oxygen scavenger chemicals in the sandwich structures was not optimal without the polymer matrix component, the oxygen barrier of HDPE was improved by a factor of about 10 over the film samples with no oxygen scavenging components.

Example 3

Several different polypropylene film samples were tested with and without a polymer compatibilizer with PVP, cobalt neodecanoate, and NHPI (Aldrich Chemicals) as provided in Table 3 below. Polypropylene was from Lyondell-Basell. The compatibilizer was maleic anhydrate grafted polypropylene with 1.2 percent maleic anhydride (Chemtura).

TABLE 3

| Runs | Polypropylene, grams | Compatibilizer, grams | PVP, Grams | Cobalt Neodecanoate, Grams | N-Hydroxyl-phthalimide, Grams |
|---|---|---|---|---|---|
| 1 | 100 | 0 | 14.29 | 2.86 | 2.86 |
| 2 | 90 | 10 | 14.29 | 2.86 | 2.86 |
| 3 | 80 | 20 | 14.29 | 2.86 | 2.86 |
| 4 | 100 | 0 | 21.44 | 4.29 | 4.29 |
| 5 | 90 | 10 | 21.44 | 4.29 | 4.29 |
| 6 | 80 | 20 | 21.44 | 4.29 | 4.29 |
| 7 | 0 | 100 | 21.44 | 4.29 | 4.29 |
| 8 | 100 | 0 | 0.00 | 0.00 | 0.00 |
| 9 | 90 | 10 | 28.58 | 5.71 | 5.71 |
| 10 | 80 | 20 | 28.58 | 5.71 | 5.71 |

The compounding procedure used to prepare the films included first melt-compounding the oxygen scavenger chemicals (PVP, Cobalt Neodecanoate, and NHPI) in an extruder. The extruder was a twin screw, co-rotating 15 mm APV extruder. The oxygen scavenging chemicals were extruded in a master batch at about 185° C. Next, the PP and compatibilizer were separately melt-compounded in an extruder at about 195° C. The extrudates from the previous two steps were then melt-compounded within the extruder at about 195° C. Lastly, films were prepared by compressing molding at about 180° C. to films of about 10 to about 14 mils thick.

The samples were then tested for oxygen transmission. Results are provided in Table 4 below. OTR was measured with an oxygen transmission rate measurement system from Modern Control, Inc. (Minneapolis, Minn.) Testing was conducted according to ASTM-D-3985 and reported in Table 4 below. In general, the method entails enclosing a single sheet of the material to be tested within a test cell. One side of the material is exposed to a flowing stream of 100% oxygen and the other side is exposed to a flowing gas stream of nitrogen with a small content of hydrogen. After passing through the test cell, the nitrogen is analyzed for its oxygen content. Any oxygen in the nitrogen gas represents oxygen permeating through the material under test conditions. As the surface area of the film is known, oxygen permeation per unit area can be calculated.

In the testing, the gas stream of oxygen and that of nitrogen with hydrogen used in this test method is humidified with water to about 50% relative humidity. This level of humidity more closely represents average ambient atmospheric conditions.

In the testing, a tank change occurred. The oxygen and nitrogen with hydrogen used in this test is taken from gas cylinders or tanks. Thus, as the gases within the tank are depleted, the tanks are replaced to restore the flow of gas.

Figure 3:
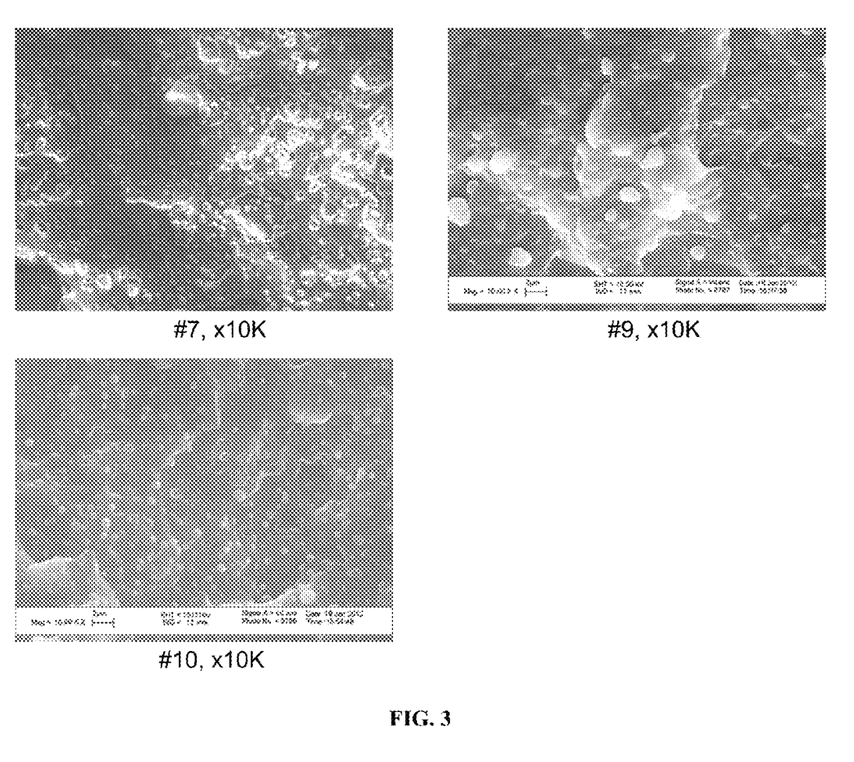
FIG. 3 includes SEM images.

In the chart below, different modules were used for the samples at 380 hours and 528 hours. This is done to ensure consistency in test results. For instance, to investigate that the testing results are representative of the sample and not influenced by which module was used, samples are tested on one module and then retested on another. The expectation is that the results will be essentially the same regardless of which module or instrument is used. Thus, the samples tested on 380 and 538 hours were done on new modules and are consistent with the previous results on the initial modules.

image for Sample number 7 shows approximately 300 to about 320 active oxygen scavenger sites per unit area of the image. The SEM image for Sample number 10 shows about 120 to about 140 active oxygen scavenger sites per unit area of the image. Based on this analysis, these examples had oxygen scavenging compositions from about 120 to about 320 active oxygen scavenger counts per about 500 to about 1000 square microns (i.e., the general area imaged in the SEM photographs.)

Based on this analysis, it is theorized, and it is not intended to be limited by this theory, that the oxygen scavenger components form a dispersed domain within the polypropylene matrix as shown in the Exemplary schematic of FIG. 1. As an oxygen stream passes through the film, it could be absorbed or consumed by the PVP within the domains if it comes into contact with one of the dispersed domains. Thus, it is believed that a high concentration of smaller domains is more effective in consuming oxygen. This is confirmed by Samples 7 and 10 that exhibited the smallest domain sizes, higher domain counts, and the best oxygen consumption over time as compared to the other samples. Samples 7 and 10 had more compatibilizer than Sample 9.

Example 4

A further study of oxygen scavenging polyolefin films was completed to study the effect of varying the compatibilizer on the oxygen scavenging performance. In this study, a master batch was made by premixing the compatibilizer, cobalt,

TABLE 4

| | Approx Thickness | | Oxygen Transmission Rate (cc/m2-day) | | | | | | |
|---|---|---|---|---|---|---|---|---|---|
| Sample | (mils) | Module | @ 5 hrs | @ 24 hrs | @ 48 hrs | @ 172 hrs | @ 190 hrs + 50 RH | @ 330 hrs | @ 380 hrs | @ 528 hrs |
| 1 | 12 | 4B | 166 | 166 | 165 | 161 | 154 | 154 | Not Tested Further | |
| 2 | 13 | 4A | 171 | 171 | 171 | 168 | 163 | 162 | | |
| 3 | 14 | 7B | 156 | 154 | 156 | 153 | 148 | 146 | | |
| 4 | 13 | 7A | 133 | 135 | 137 | 134 | 130 | 133 | | |
| 5 | 14 | 6A | 160 | 158 | 157 | 153 | 151 | 149 | | |
| 6 | 12 | 6B | 168 | 166 | 166 | 161 | 159 | 157 | | |
| 7 | 15 | 1B | 150 | 147 | 140 | 51 | 40 | 10 | 6 | 1.8 |
| 8 (white) | 16 | 1A | 172 | 172 | 171 | 169 | 168 | 167 | 164 | 163 |
| 9 | 14 | 5B | 167 | 166 | 164 | 169 | 144 | 144 | 150 | 150 |
| 10 | 13 | 5A | 175 | 175 | 174 | 170 | 152 | 104 | 83 | 4.5 |

All samples started at midday. Data collection stopped after 48 hours due to tank change. (Tested at room temperature.) All cells - humidification water added after 172 hrs. Reading at 190 hrs and beyond are with increased humidification. All samples restarted after 172 hrs. New indicated test times + 168 hrs taken as total time (hours shown are actual). Readings at 528 hrs and at 380 hrs indicates samples on new modules. Samples 7/8 switched with 9/10.

Samples 7, 9, and 10 were investigated for morphological analysis. These samples were fractured after soaking with liquid nitrogen. The SEM samples were fractured from strips cut from polypropylene films. Some samples might be further soaked in water to remove the water soluble phase, oxygen scavenger chemical mixture if needed. Each of the samples was viewed under a microscope and it was determined that each had dispersed domains within a larger matrix. Sample 9 has less domains, but larger size domains than Samples 7 and 10. Samples 7 and 10 have more domains that are approximately 1 micron in size. FIG. 3 shows the SEM images for these samples.

Figure 4:
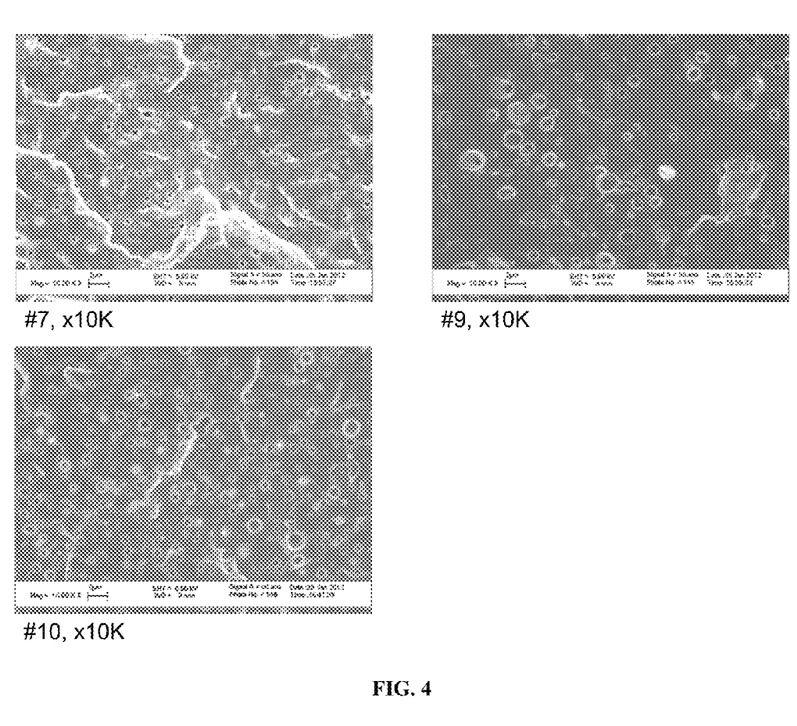
FIG. 4 includes SEM images.

The samples were fractured and then soaked in water to remove water-soluble materials. An SEM/EDX analysis confirmed that the dispersed domain is related to the scavenger chemicals and has a high concentrate of oxygen and cobalt. FIG. 4 shows the SEM images.

A visual analysis using optical microscopy was completed to count the number of oxygen scavenging domains per unit area in the SEM images of FIG. 2 in Samples 7 and 9. The analysis was completed by ImagePro methodology. The SEM NHPI and PVP and compounding in a twin-screw extruder. The extrudate was then dry-mixed with PP powder and extruded in a twin-extruder as a monolayer film. The films were prepared by first extruding a master batch at about 185° C. Then, the master batch was compound extruded with the polypropylene at about 195° C. Films were prepared by compression molding about 180° C. Compositions of the film samples are set forth in Table 5 below.

In the table below, the base polymer was a homopolymer polypropylene flake with a melt flow rate (MFR) of about 7 (Lyondell Basell). The compatibilizer 1001N is polypropylene modified with about 6% acrylic acid and has melt index (MFI) of about 40 (Chemtura). The compatibilizer 3000 is polypropylene modified with about 1.2% maleic anhydride with a melt index (MI) of about 1000 (Chemtura). The compatibilizer 3200 is polypropylene modified with about 1% maleic anhydride and has a melt index of about 250 (Chemtura). PVP, if used, was from Scientific Polymer Products, Inc., Cobalt was from Shepherd (1354), and NHPI was from Aldrich Chemical. The oxygen scavenging results (OTR) of these samples are shown in Table 6 below. OTR was measured similar to the previous Examples.

TABLE 5

Composition of Film Samples

| Sample | Systems | Base Polymer, (Pro-Fax P165-41), grams | Compatibilizer, grams | PVP, grams | Cobalt Neodecanoate, grams | N-Hydroxyl phthalimide, grams | Processing Method |
|---|---|---|---|---|---|---|---|
| Control | PP | 100 | None | None | None | None | control |
| 1 | PP | 80 | 20 grams (1001N) | 28.58 | 5.71 | 5.71 | Masterbatch |
| 2 | PP | 80 | 20 grams (3000) | 28.58 | 5.71 | 5.71 | Masterbatch |
| 3 | PP | 80 | 20 grams (3200) | 28.58 | 5.71 | 5.71 | Masterbatch |

TABLE 6

OTR Results

| Sample | Thickness | Day 0 | Day 6 | Day 9 OTR | Day 14 | Day 21 |
|---|---|---|---|---|---|---|
| Control | 14.5 | 147 | 146 | 145 | 144 | 144 |
| 1 | 12.5 | 134 | 43 | 15 | 5.299 | 0.491 |
| 2 | 13 | 128 | 2 | 0.058 | 0.027 | 0.021 |
| 3 | 12.5 | 139 | 1 | 0.349 | 0.215 | 0.320 |

The OTR results show that Sample 1 using a compatibilizer with about 6 percent acrylic acid provides dramatically improved oxygen scavenging over the control. In addition, Samples 2 and 3 with maleic anhydride compatibilizer demonstrated even better scavenging over the acrylic acid sample (1) and the Control. Sample 2 with 1.2 percent maleic anhydride in the compatibilizer provided the best results as it demonstrated about a 15 fold improvement over the sample with 1 percent maleic anhydride. Samples 2 and 3 provided about a 6800 and about a 450 fold improvement in oxygen barrier properties of the Control (neat) polypropylene film, respectfully.

Example 5

As a comparison, a different compatibilizer was evaluated in polyethylene. For this evaluation, the compatibilizer was 1-butene-ethylene-malic anhydride copolymer with a grafting ratio of about 0.5 to 1. Results are shown in tables 7 and 8 below. The oxygen transmission demonstrated little improvement over the control polyethylene film.

TABLE 7

Composition of Film Samples

| Sample | Systems | Base Polymer, (DMDH-6400), grams | Compatibilizer, grams | PVP, grams | Cobalt Neodecanoate, grams | N-Hydroxyl phthalimide, grams | Processing Method |
|---|---|---|---|---|---|---|---|
| Control | PE | 100 | None | None | None | None | control |
| 1 | PE | 80 | 20 grams (3149) | 28.58 | 5.71 | 5.71 | Masterbatch |
| 2 | PE | 80 | 20 grams (3149) | 28.58 | 5.71 | 5.71 | One-step |

TABLE 8

OTR Results

| Sample | Thickness | Day 0 | Day 6 | Day 9 OTR | Day 14 | Day 21 |
|---|---|---|---|---|---|---|
| Control | 14 | 67 | 67 | 67 | 67 | 67 |
| 1 | 15 | 111 | 116 | 114 | 110 | 102 |
| 2 | 13 | 78 | 79 | 78 | 75 | 70 |

Example 6

A comparison of processing using a master batch of the compatibilizer, cobalt, NHPI, and PVP was compared to a process in which the compatibilizer was processed with the polypropylene. Sample 3 of Example 4 was prepared using a master batch process. Sample 10 of Example 3 was prepared by first blending the oxygen scavenging compounds (PVP, cobalt, and NHPI) separately from the polypropylene and compatibilizer. These samples had similar amount of ingredients and the same compatibilizer (i.e., 3200), but were processed differently. After about 500 hours of testing, the master batch processed sample exhibited an OTR of about 0.320 as shown in Table 6 above. Table 4 shows that approximately the same composition, but processed without the master batch method demonstrated an OTR of about 4.5. Thus, use of the master batch processing method demonstrates about a 14 fold improvement in oxygen scavenging.

It will be understood that various changes in the details, materials, and arrangements of formulations and ingredients, which have been herein described and illustrated in order to explain the nature of the method and compositions, may be made by those skilled in the art within the principle and scope of the description herein.

What is claimed is:

1. An oxygen scavenging polymer composition comprising:
   a continuous non-polar polymer composition including a polyolefin;
   oxygen scavenging domains dispersed in the continuous non-polar polymer composition, the oxygen scavenging domains including an oxidizable polymer, a transition metal catalyst or salt thereof, and a source of N-oxyl radicals effective to bind with oxygen passing through the continuous non-polar polymer composition, the oxygen scavenging domains containing polar regions within the continuous non-polar polymer composition; and
   a polymeric compatibilizer in the continuous non-polar polymer composition, the polymeric compatibilizer having a polar moiety and a non-polar moiety and in amounts effective to uniformly disperse the polar oxygen scavenging domains in the continuous non-polar polymer composition.

2. The oxygen scavenging polymer composition of claim 1, wherein the amount of the polymeric compatibilizer is effective to form the oxygen scavenging domains of about 15 nm to about 10 microns in size.

3. The oxygen scavenging polymer composition of claim 1, wherein the amount of polymeric compatibilizer is effective to form about 100 to about 400 oxygen scavenging domains per about 500 to about 1000 square microns of the continuous non-polar polymer composition.

4. The oxygen scavenging polymer composition of claim 1, wherein the polymeric compatibilizer has about 0.1 to about 6 percent of a polar moiety grafted on a non-polar polymeric backbone.

5. The oxygen scavenging polymer composition of claim 1, wherein the polymeric compatibilizer has a non-polar polyolefin backbone and a grafted carboxylic acid group thereon forming the polar moiety.

6. The oxygen scavenging polymer composition of claim 1, wherein the polymeric compatibilizer is maleic anhydride grafted polyolefin.

7. The oxygen scavenging polymer composition of claim 6, wherein the maleic anhydride grafted polyolefin includes about 0.2 to about 2 percent maleic anhydride.

8. The oxygen scavenging polymer composition of claim 1, wherein the oxidizable polymer is a base polymer with repeating alkyl groups substituted with a cyclic amide.

9. The oxygen scavenging polymer composition of claim 8, wherein the oxidizable polymer is polyvinylpyrrolidone.

10. The oxygen scavenging polymer composition of claim 1, wherein the transition metal catalyst or salt thereof is cobalt neodecanoate.

11. The oxygen scavenging polymer composition of claim 1, wherein the source of N-oxyl radicals is a hydroxyimide compound.

12. The oxygen scavenging polymer composition of claim 1, wherein the source of N-oxyl radicals is n-hydroxyphthalimide.

13. The oxygen scavenging polymer composition of claim 1, wherein the source of N-oxyl radicals is an ester of a hydroxyimide effective to withstand temperatures of up to about 230° C.

14. The oxygen scavenging polymer composition of claim 1, wherein the source of N-oxyl radicals is an ester of hydroxyimide including an acetoxy derivative of n-hydroxyphthalimide.

15. The oxygen scavenging polymer composition of claim 14, wherein the ester of hydroxyimide includes n-hydroxyphthalimide acetate.

* * * * *